United States Patent [19]
Itsumi

[11] Patent Number: 5,940,525
[45] Date of Patent: Aug. 17, 1999

[54] FINGERPRINT DETECTION APPARATUS

[75] Inventor: Kazuhiro Itsumi, Kawasaki, Japan

[73] Assignee: Kabushiki Kaisha Toshiba, Kawasaki, Japan

[21] Appl. No.: 08/811,718

[22] Filed: Mar. 6, 1997

[30] Foreign Application Priority Data

Mar. 8, 1996 [JP] Japan .................................. 8-051981

[51] Int. Cl.⁶ .............................. G06K 7/00; G06K 9/00; G06K 9/20; B42D 15/00
[52] U.S. Cl. .......................... 382/124; 382/115; 382/116; 382/312; 283/68; 283/69
[58] Field of Search ................................ 382/115, 116, 382/124, 312; 283/68, 69

[56] References Cited

U.S. PATENT DOCUMENTS

| | | | |
|---|---|---|---|
| 4,353,056 | 10/1982 | Tsikos ...................................... | 382/124 |
| 4,532,508 | 7/1985 | Ruell ........................................ | 382/124 |
| 4,783,823 | 11/1988 | Tasaki et al. ............................ | 382/124 |
| 5,010,774 | 4/1991 | Kikuo et al. ........................ | 73/862.046 |
| 5,079,949 | 1/1992 | Tamori ...................................... | 73/172 |
| 5,325,442 | 6/1994 | Knapp ...................................... | 382/124 |
| 5,400,662 | 3/1995 | Tamori ...................................... | 382/124 |
| 5,429,006 | 7/1995 | Tamori ...................................... | 382/124 |
| 5,451,724 | 9/1995 | Nakazawa et al. ................... | 178/18.05 |
| 5,559,504 | 9/1996 | Itsumi et al. ............................ | 382/115 |

OTHER PUBLICATIONS

Technical Digest of the 13$^{th}$ Sensor Symposium, pp. 229–232, 1995, K. Itsumi, et al., "A New Personal Verification Sensor System Using an Electrode Array".

Primary Examiner—Leo H. Boudreau
Assistant Examiner—Daniel G. Mariam
Attorney, Agent, or Firm—Oblon, Spivak, McClelland, Maier & Neustadt, P.C.

[57] ABSTRACT

A fingerprint detection apparatus includes a plurality of first electrodes having linear shapes and arranged in parallel to one another, a plurality of second electrodes arranged between said plurality of first electrodes and arranged in the longitudinal direction of each of said plurality of first electrodes, keeping apart from one another, and detecting section for obtaining a fingerprint image in accordance with resistance value groups each of which is generated between the adjacent first and second electrodes when the finger of a person required to be identified has been brought into contact with said plurality of first and second electrodes. Therefore, the fingerprint of a person required to be identified can be detected without a complicated optical system.

15 Claims, 3 Drawing Sheets

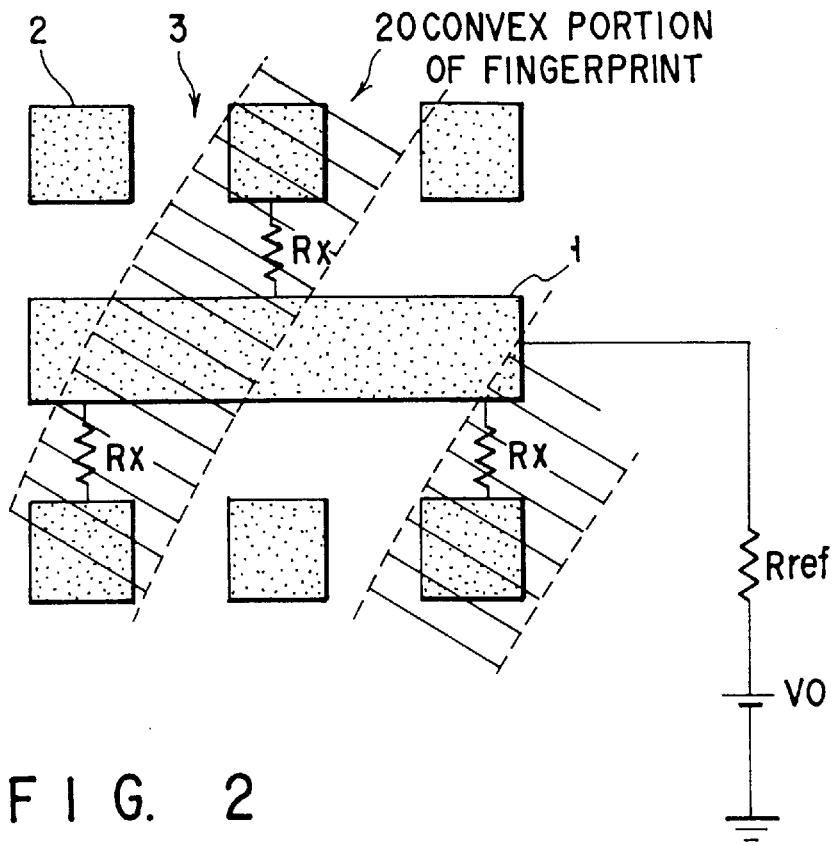
F I G. 2
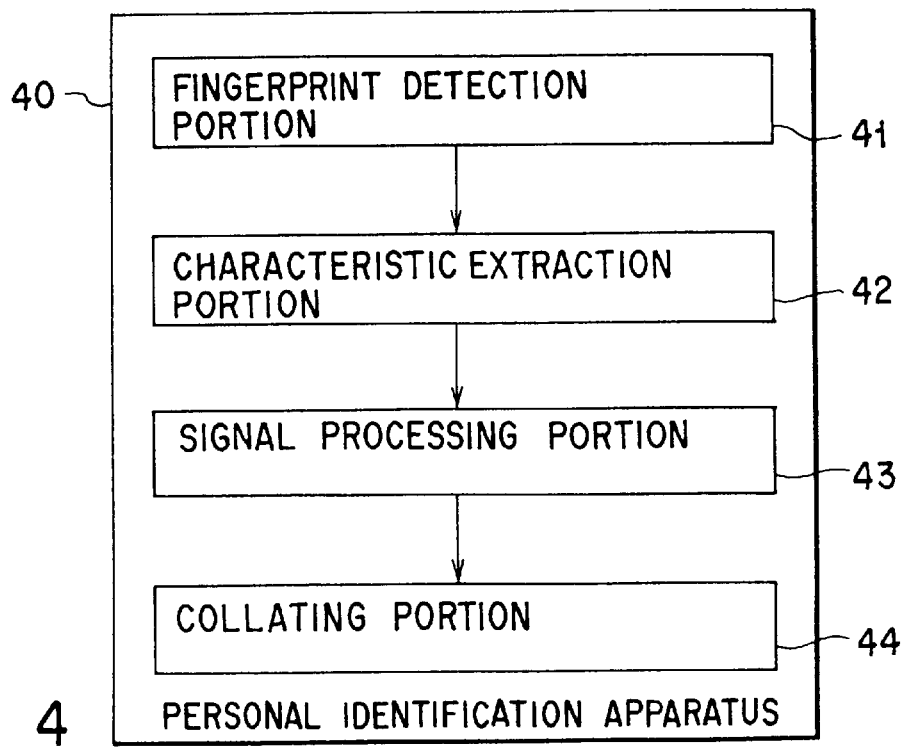
F I G. 4

FINGERPRINT DETECTION APPARATUS

BACKGROUND OF THE INVENTION

The present invention relates to a fingerprint detection apparatus for detecting the fingerprint of a person required to be identified as a two-dimensional image signal.

In recent years, a personal identification apparatus has attracted attention, which determines whether or not a person required to be identified is a person who has been registered to perform identification in order to control entrance and exit to and from an important institution. A portion of personal identification apparatuses of the foregoing type has been adapted to a method of detecting the fingerprint in order to identify a person. Among a variety of suggested methods adaptable to the fingerprint detection apparatus, a major portion of the methods has a structure such that the fingerprint is detected as a two-dimensional image by an optical method. The optical fingerprint detection methods include three typical methods below.

A first method has a structure such that the finger of a person required to be identified is brought into contact with the surface of a transparent member, for example, a prism, and light emitted from a light source is made incident upon another surface of the transparent member to converge light totally reflected by the surface touched by the finger by using an image forming lens to form the image on an image pickup device so that a fingerprint image is read. The foregoing method is called a total reflection method.

A second method has a structure having a similar optical system and arranged such that only light scattered by the convex portions of the fingerprint is converged by an image forming lens to form an image on an image pickup device so as to obtain a fingerprint image. The foregoing method is called an optical-path separation (scattering) method.

A third method has the steps of converging light emitted from a light source by a condenser lens, bending the optical passage by a mirror to irradiate a surface of contact between the surface of a transparent member and the finger of a person required to be identified with a small light beam spot, moving the mirror in a plane which is in parallel to the transparent member to scan the surface of the finger with a light beam spot and making scattered light reflected by the surface of the finger incident upon an optical sensor through a mirror to photoelectrically convert light so as to obtain a two-dimensional fingerprint image. The foregoing method is called a scanning method.

However, the fingerprint detection apparatuses respectively adapted to the foregoing three methods involve the size of the optical system comprising the light source, the prisms, the lenses and so forth being enlarged excessively. Thus, there arises a problem in that the size of the fingerprint detection apparatus cannot be reduced. In particular, the scanning method must be further provided with an optical system for forming light into a small light beam spot and a scanning mechanism using the light beam spot. Since each of the foregoing additional units has an optically or mechanically complicated structure and requires a significant accuracy, the overall size and the cost of the fingerprint detection apparatus cannot be reduced.

BRIEF SUMMARY OF THE INVENTION

Accordingly, it is an object of the present invention to provide a fingerprint detection apparatus which is capable of detecting the fingerprint of a person required to be identified as a two-dimensional image signal without a complicated optical system.

According to one aspect of the present invention, there is provided a fingerprint detection apparatus comprising a plurality of first electrodes having linear shapes and arranged in parallel to one another; a plurality of second electrodes arranged between the plurality of first electrodes and arranged in the longitudinal direction of each of the plurality of first electrodes, keeping apart from one another; and detecting means for obtaining a fingerprint image in accordance with resistance value groups each of which is generated between the adjacent first and second electrodes when the finger of a person required to be identified has been brought into contact with the plurality of first and second electrodes.

The fingerprint detection apparatus may have a structure such that the detecting means includes a reference power source for applying voltage between the adjacent first and second electrodes. The detecting means may include a reference resistance connected in series to the reference power source and having a predetermined resistance value. In this case, the detecting means may include means for obtaining the fingerprint image based on the resistance value group by measuring voltage drop of the reference resistance.

The detecting means may include switching means for controlling the voltage from the reference power source to be sequentially applied between the adjacent first and second electrodes.

The switching means may include a plurality of first switches connected to the plurality of first electrodes respectively. In this case, the switching means may include means for performing sequence control such that the plurality of first switches are sequentially switched on. On the other hand, the switching means may include a first common connection line for commonly connecting a first group of the plurality of second electrodes, and a second common connection line for commonly connecting a second group of the plurality of second electrodes. In this case, the first common connection line may commonly connect the second electrodes arranged on odd-number order rows, and the second common connection line may commonly connect the second electrodes arranged on even-number order rows. The switching means may include a plurality of second switches connected to the first and second common connection lines. The switching means may include means for performing sequence control such that each second switch connected to the second electrode adjacent to the first electrode connected to the first switch which has been switched on is sequentially switched on.

The fingerprint detection apparatus may further comprise characteristic pattern generating means for generating a characteristic pattern of the fingerprint in accordance with the fingerprint image detected by the detecting means. The fingerprint detection apparatus may further comprise means for performing identification by comparing the characteristic pattern of the fingerprint generated by the characteristic pattern generating means with a previously registered characteristic pattern.

The plurality of first and second electrodes may be made of thin conductive films. The fingerprint detection apparatus may further comprise an insulating substrate on which the plurality of first and second electrodes are mounted.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 2 is a diagram for explaining a principle for measurement for the fingerprint detection apparatus according to the embodiment;

FIG. 4 is a block diagram showing an example of the structure which is employed in a case where the embodiment is applied to a personal identification apparatus.

DETAILED DESCRIPTION OF THE INVENTION

Figure 1:
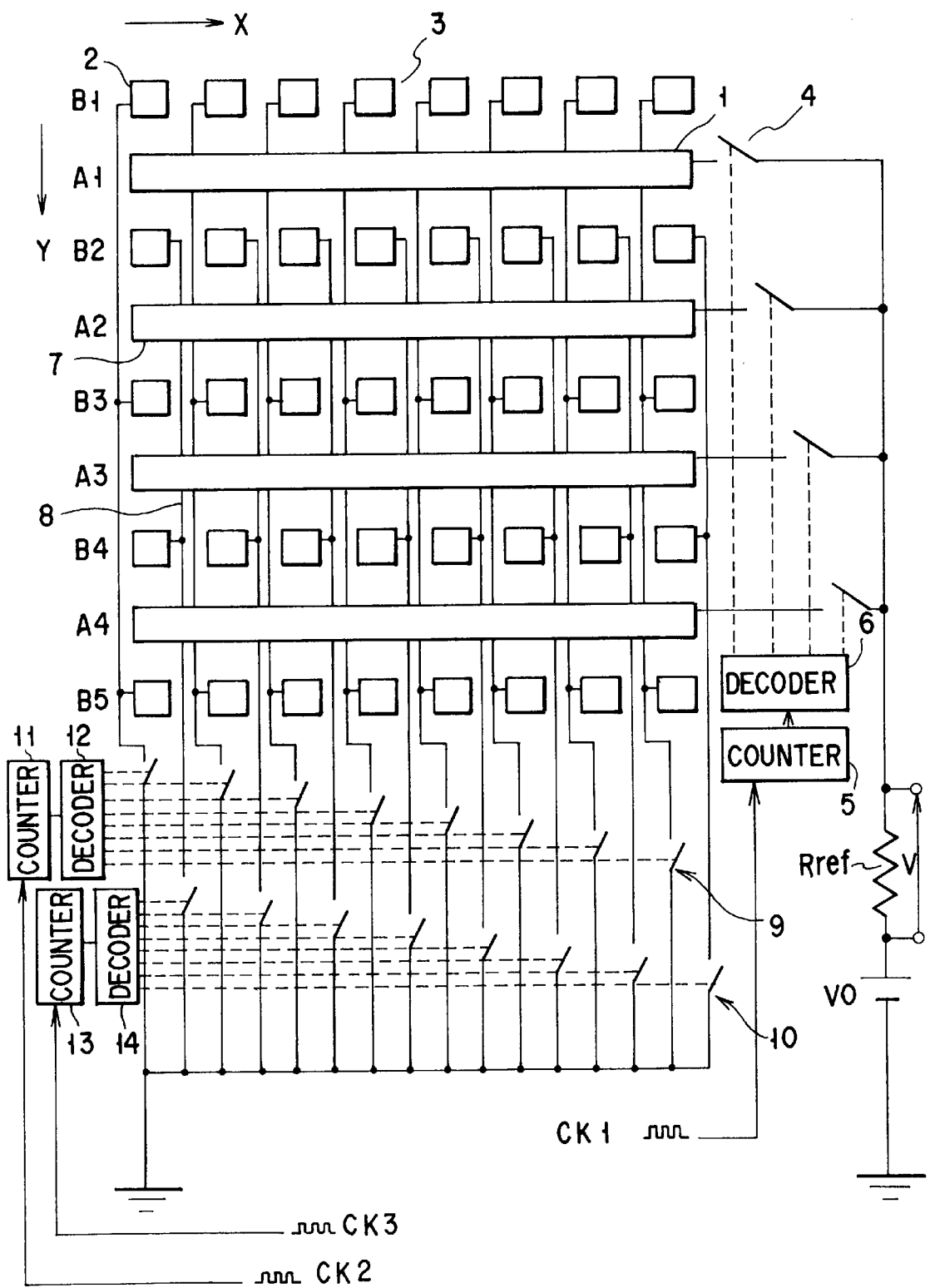
FIG. 1 is diagram showing the schematic structure of a fingerprint detection apparatus according to an embodiment of the present invention.

Referring to the drawings, an embodiment of the present invention will now be described.

FIG. 1 is diagram showing the schematic structure of a fingerprint detection apparatus according to an embodiment of the present invention. As shown in FIG. 1, a plurality of linear electrodes 1 and a plurality of point electrodes 2 form a sensor portion 3. The sensor portion 3 measures a resistance value (or an electric current value) between the adjacent linear electrode 1 and the point electrode 2 when the finger of a person required to be identified has touched the sensor portion 3. In this embodiment, the adjacent electrodes form a resistance-value detection pixel in the form of a matrix composed of 8×8 electrodes.

The plural linear electrodes 1 are arranged in parallel to each other at a pitch which is twice the arrangement pitch (the measurement pitch) of the foregoing matrix. The plural point electrodes 2 are arranged at the same pitch as the measurement pitch in the longitudinal direction of the linear electrodes 1 which is the direction X of the sensor portion 3 shown in FIG. 1 such that eight point electrodes 2 form one group forming a line. In the direction Y, the point electrodes 2 are arranged at the pitch which is twice the measurement pitch between the linear electrodes 1.

The width and the arrangement pitch of each of the linear electrodes 1 and the vertical and lateral size of each of the point electrodes 2 are determined such that the realized measurement pitch is shorter than the pitch (which varies individually and which is about 0.5 mm in general) of convex and concave portions of the fingerprint. If the measurement pitch is 0.2 mm, the required sizes are such that the width of the linear electrode 1 is 0.1 mm, the arrangement pitch of the same is 0.4 mm, the size of the point electrode 2 is 0.1 mm and the distance between the point electrodes 2 is 0.1 mm.

A matrix having size of 64×64 is practically required. If the measurement pitch is 0.2 mm, the sensor portion 3 must have an area of 12.8 mm×12.8 mm.

The linear electrodes 1 and the point electrodes 2 are formed by an electrically conductive thin film formed on the surface of a common insulating substrate. The materials of the foregoing elements are, for example, Cu, Au, Ni, Pt or Pd, which are not eroded by the body fluid of the human body, such as sweat. The substrate is made of a material, such as epoxy glass, for a printed circuit board, ceramic, a thin metal plate coated with an insulating film or the like.

The linear electrodes 1 are respectively connected to ends of first analog switch group 4. The other ends of the first analog switch group 4 are commonly connected to an end of reference resistance Rref. Another end of the reference resistance Rref is connected to a positive terminal of a voltage source Vo. A negative terminal of the voltage source Vo is grounded. The voltage source Vo applies reference voltage to a series circuit formed by the resistance of the finger touched between the adjacent electrodes and the reference resistance Rref.

The first analog switch group 4 is controlled by the output from a decoder 6 for decoding an output from a counter 5. The counter 5 and the decoder 6 perform sequence control such that they sequentially switch the first analog switch group 4 one at a time in the descending order from the top end (row A1) to the lower end (row A4) in synchronization with clock signal CK1.

The point electrodes 2 are electrically independent from one another in the direction X of the sensor portion 3, while the point electrodes 2 are arranged such that odd-number order electrodes (rows B1, B3 and B5) and even-number order electrodes (rows B2 and B4) from the top end are connected commonly by common connection lines 7 and 8, respectively. The common connection lines 7 and 8 are respectively connected to ends of the second analog switch groups 9 and 10. Another end of each of the second analog switch groups 9 and 10 is grounded.

The second analog switch groups 9 and 10 are controlled by outputs from decoders 12 and 14 which decode outputs from the counters 11 and 13. The counters 11 and 13 and the decoders 12 and 14 perform sequence control to, from left to right, switch the second analog switch groups 9 and 10 by one at a time to switch on the same in synchronization with the clock signals CK2 and CK3.

Referring to FIG. 2, a principle for measuring a fingerprint image according to this embodiment will now be described. FIG. 2 is an enlarged view of the sensor portion 3 shown in FIG. 1. In FIG. 2, the first and second analog switch groups 4, 9 and 10 are omitted. As shown in FIG. 2, when the finger of a person required to be identified is pressed against the linear electrodes 1 and the point electrodes 2, a convex portion 20 of the fingerprint is introduced and brought into close contact with the area between the adjacent electrodes. In general, the convex portion 20 of the fingerprint has sweat pores and water (sweat) slightly containing conductive ions are always exhaled from the sweat pores. Therefore, conductive passages are formed between adjacent electrodes directly under the convex portion 20 of the fingerprint, thus causing the resistance value between the adjacent electrodes to be reduced. Assuming that the resistance between adjacent electrodes is Rx, potential difference V expressed by the following equation is generated at the two ends of the reference resistance Rref:

$$V = Rref \cdot Vo/(Rref + Rx) \tag{1}$$

In this embodiment, each potential difference V between the adjacent electrodes is read as change in the resistance value between electrodes so that a fingerprint image is obtained. That is, the first and second analog switch groups 4, 9 and 10 shown in FIG. 1 are switched in response to clock signals CK1, CK2 and CK3. In synchronization with the switching operation, for example, a sample/hold circuit is operated to sequentially measure the potential differences V so that the fingerprint of the person required to be identified is detected as a two-dimensional image.

Figure 3:
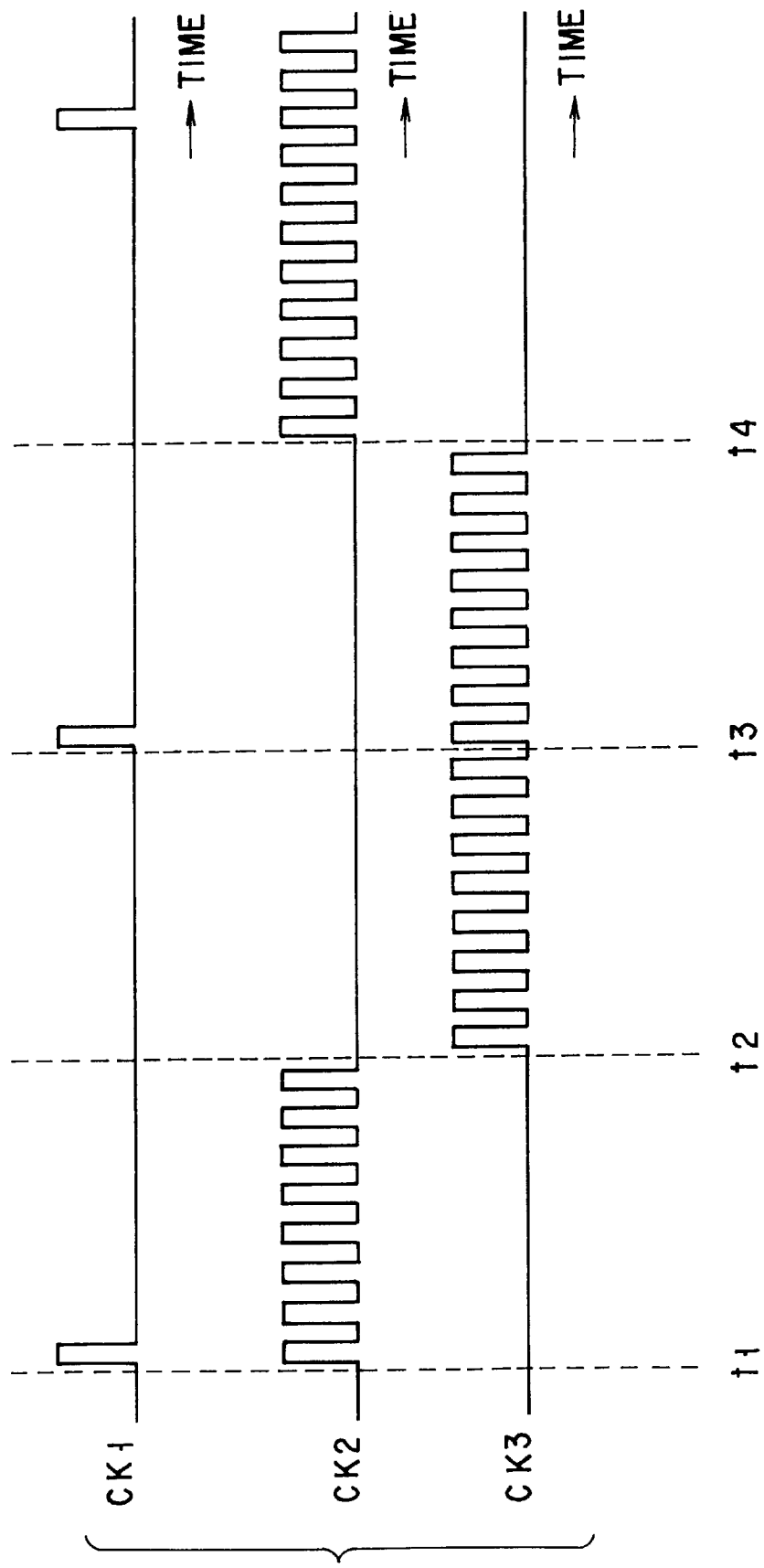
FIG. 3 is a timing chart showing various clock signals generated by the fingerprint detection apparatus according to the embodiment.

The operations which are performed in response to various clock signal generated by the fingerprint detection apparatus according to this embodiment will specifically be described with reference to a timing chart shown in FIG. 3.

A case will now be considered in which clock signals CK1, CK2 and CK3 have been supplied in a state where the finger of a person required to be identified is brought into contact with the sensor portion 3. Note that this embodiment has a structure such that the counters 6, 11 and 13 start counting at the first transitions of the clock signals CK1, CK2 and CK3.

When the fingerprint detection apparatus has been turned on, clock signals CK1 and CK2 are supplied at time t1. In response to one pulse of the clock signal CK1, the first analog switch group 4 is switched through the counter 5 and the decoder 6 so that the linear electrode on the row A1 in the sensor portion 3 is brought to a selective state. On the other hand, the second analog switch group 9 is switched through the counter 11 and the decoder 12 in response to clock signal CK2 so that left end point electrodes 2 on the odd-number order rows (rows B1, B3 and B5) are brought to a selective state. The potential difference V between the two ends of the reference resistance Rref is measured.

Initially, the resistance value between the linear electrode on the row A1 and the left end point electrode on the row B1 in the sensor portion 3 is measured. In a period to time t2, the state of electrical conduction of the linear electrode on the row A1 is not changed. The second analog switch group 9 is sequentially switched through the counter 11 and the decoder 12 in response to the clock signal CK2 so that the point electrodes on the rows B1, B3 and B5 are sequentially brought to the selective state. Furthermore, the resistance values between the linear electrode on the row A1 and the point electrodes on the row B1 in the sensor portion 3 are sequentially measured from the left to the right.

In a period from time t2 to time t3, the selective state of the linear electrode on the row A1 is not changed. In place of input of the clock signal CK2, the clock signal CK3 is input so that the second analog switch group 10 is sequentially switched through the counter 13 and the decoder 14. Thus, the even-number order (rows B2 and B4) point electrodes from the top end are sequentially brought to the selective state. Then, the resistance values between the linear electrode on the row A1 and the point electrodes on the row B2 are sequentially measured from the left to the right.

In a period from time t3 to time t4, the clock signals CK1 and CK3 are input, and the clock signal CK3 is input. When the clock signal CK1 has been input, the first analog switch group 4 is switched through the counter 5 and the decoder 6 so that the linear electrode on the row A2 in the sensor portion 3 is brought to the selective state. Since the second analog switch group 10 has been switched from the left to the right in the period from time t2 to time t3, input of the clock signal CK3 immediately after time t3 causes the second analog switch group 10 to be again sequentially switched from the left to the right through the counter 5 and the decoder 6. Therefore, the point electrodes on the rows B2 and B4 are sequentially brought to the selective state. Thus, the resistance values between the linear electrode on the row A2 and the point electrodes on the row B2 are sequentially measured.

Then, a similar process is performed such that the first and second analog switch groups 4, 9 and 10 are switched in response to the clock signals CK1, CK2 and CK3 so that the resistance values between the adjacent electrodes are sequentially measured. As a result, the fingerprint of the person required to be identified can be detected as a two-dimensional image in the form of an 8×8 matrix.

As described above, the odd-number order point electrodes 2 (rows B1, B3 and B5) from the top end are commonly connected to one another by the common connection line 7 and the even-number order (rows B2 and B4) are commonly connected to one another by the common connection line 8. Therefore, when the second analog switch groups 9 and 10 have been switched, the point electrodes, which are commonly connected to one another, are simultaneously brought to the selective state.

Therefore, when the resistance values between the linear electrode on the row A1 and the point electrodes on the row B1 in the sensor portion 3 are measured for example, also the point electrodes 2 on the rows B3 and B5 respectively are brought to the conductive state simultaneously with the point electrodes on the row B1. Thus, the resistance value between the adjacent electrodes required to be measured and each resistance value between the linear electrode on the row A1 and the point electrodes on the rows B3 and B5 are measured.

Assuming that the resistance values between the linear electrode on the row A1 and the point electrodes 2 on the rows B1, B3 and B5 are R1, R3 and R5, the value of the synthesized resistance R measured in the above-mentioned state is expressed by the following equation:

$$1/R = (1/R1) + (1/R3) + (1/R5) \qquad (2)$$

Assuming that the change in the resistance value per unit area occurring due to the contact of the convex portion of the fingerprint of the person required to be identified with the sensor portion 3 is substantially constant over the surface of the finger of the same person, the distance between the electrodes for measuring R3 is five times the distance for measuring R1. The distance between the electrodes forming R5 is 13 times the distance of the same for forming R1. Therefore, R3 is at least 5×R1 or greater, while R5 is 13×R1 or greater. Thus, the value of the synthesized resistance R is not more than 1.092×R1. As a result, the measured resistance value is considered to be only the value of R1. Therefore, an accurate fingerprint image can be obtained as required. The foregoing fact is applied when the resistance values between other point electrodes and another adjacent linear electrode are measured.

As described above, according to this embodiment, the resistance values of the detection pixels arranged in the matrix configuration are sequentially measured by the linear electrodes 1 and the point electrodes 2 so that a two-dimensional fingerprint image is obtained. Therefore, an optical system comprising a light source, prisms, lenses and the like is not required as is required by the conventional apparatus. Accordingly, the structure and the peripheral circuits can significantly be simplified. As a result, the overall size, weight and the cost of the fingerprint detection apparatus can be reduced. Since the overall shape of the fingerprint detection apparatus can be formed into a thin shape, the apparatus according to the present invention can be applied to, for example, a smart card.

Meanwhile, it is possible to detect the fingerprint as a two-dimensional image only by using the point electrodes arranged in the matrix configuration without using the linear electrode. In this case, the foregoing structure corresponds to a structure similar to this embodiment comprising detection pixels in an 8×8 matrix configuration in such a manner that the linear electrodes shown in FIG. 1 are replaced by eight point electrodes. Since 8×5=40 point electrode are provided for the structure shown in FIG. 1, the total number of the point electrodes is 40+32=72. If analog switches are respectively connected to the point electrodes employed in place of the linear electrode, 16+32=48 analog switches are required because the analog switches for forming the second analog switch groups 9 and 10 are included. Therefore, many analog switches are required. Thus, the size and cost of the fingerprint detection apparatus cannot be reduced as required. If the number of the matrices is required to be increased, the foregoing disadvantage becomes more critical.

On the other hand, this embodiment, having the structure comprising the linear electrodes 1 and the point electrodes 2 and formed such that the even-number order point electrodes 2 and the odd-number order point electrodes 2 are commonly connected to one another so as to respectively be connected to the second analog switch groups 9 and 10, is able to significantly decrease the number of the analog switches. Specifically, if n×n matrices are used to form the space between the electrodes, the number of the analog switches is made to be 2n+n/2.

FIG. 4 is a block diagram showing a structure employed when the structure according to this embodiment is applied to a personal identification apparatus. The personal identification apparatus 40 has a fingerprint detection portion 41, a characteristic extraction portion 42, a signal processing portion 43 and a collation portion 44.

The fingerprint detection portion 41 includes the linear electrodes 1, the point electrodes 2, the first and second analog switch groups 4, 9 and 10, the counters 5, 11 and 13, the decoders 6, 12 and 14, the reference resistance Rref and voltage source Vo shown in FIG. 1.

The personal identification apparatus 40 is structured such that the fingerprint of a person required to be identified is detected as a two-dimensional image signal by the fingerprint detection portion 41. Then, the characteristic of the fingerprint is extracted in response to the two-dimensional image signal obtained by the characteristic extraction portion 42. Then, the signal processing portion 43 subjects the output from the characteristic extraction portion 42 to a filtering process, an analog-digital conversion and the like to output a characteristic pattern (hereinafter called "data to be collated") of the person required to be identified. The data to be collated and a characteristic pattern registered previously are subjected to a comparison by the collation portion 44 to determine whether or not the person required to be identified is a person who has been registered. Then, a result of the determination is output from the collation portion 44.

As described above, according to the present invention, there is provided a fingerprint detection apparatus having no complicated optical system and capable of detecting the fingerprint of a person required to be identified as a two-dimensional image signal.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, although the foregoing embodiment has been described to use the voltage source Vo as the reference power source, an electric-current source may be employed in place of the voltage source Vo. Although the above-mentioned embodiment has the structure such that the linear electrodes are connected to the reference resistance and the reference power source and the point electrodes are connected to the earth, the foregoing connection relationship may be reversed. Although the foregoing embodiment is arranged to perform the switching operation such that the resistance value groups are sequentially measured from the upper sensor group to the lower sensor group, the order for measuring the resistance value groups is not limited to the above-mentioned order. Thus, another measuring order may be employed. Although the above-mentioned structure is formed such that a plurality of the point electrodes for one row are arranged between the adjacent linear electrodes, another structure in which the point electrodes for two or more rows are arranged may be employed. Although the above-mentioned embodiment has been described to have a structure such that the linear electrodes and the point electrodes are alternately arranged over the substrate, a partially alternative arrangement may be employed. As described above, the sensor portion may be formed by only the point electrodes without use of the linear electrodes. Additionally, the shape of the point electrodes adopted in the embodiment may be modified to a rectangular form, a round form, spheroidal form, or the like.

I claim:

1. A fingerprint detection apparatus for obtaining a two-dimensional image of a fingerprint, comprising:

a plurality of point electrodes arranged in rows and columns to form a matrix;

a plurality of parallel linear electrodes extending along a first direction corresponding to a direction of said rows or columns, wherein each linear electrode is positioned between pairs of first ones of said plurality of point electrodes forming one of said rows or columns and second ones of said plurality of point electrodes forming a next adjacent one of said rows or columns;

a plurality of connection lines extending in a direction different from said first direction, wherein each connection line commonly connects together a group of point electrodes including only one of said point electrodes of any one of the pairs so that the point electrodes of any pair on opposite sides of a given linear electrode are disconnected; and means for determining resistance between any particular linear electrode and a point electrode adjacent thereto by applying a predetermined voltage between the particular linear electrode and one of said plurality of connection lines.

2. The apparatus according to claim 1, wherein said means for determining resistance includes, a plurality of first switches, wherein each first switch is connected to a respective one of said plurality of linear electrodes and a first terminal of a voltage source supplying said predetermined voltage, a plurality of second switches, wherein each second switch is connected to a respective one of said plurality of connection lines and a second terminal of said voltage source supplying said predetermined voltage, and means for performing sequence control relative to said plurality of first and second switches such that said predetermined voltage between said each linear electrode and each one of said plurality of connection lines is applied sequentially to determine the resistance between each linear electrode and each point electrode adjacent thereto.

3. The apparatus according to claim 1, wherein said means for performing sequence control includes a plurality of counters and decoders.

4. The apparatus according to claim 1, wherein said means for determining resistance includes a reference power source for applying said predetermined voltage.

5. The apparatus according to claim 1, further comprising means for obtaining a fingerprint image based on plural resistance values being outputted from said means for determining resistance.

6. The apparatus according to claim 1, wherein said plurality of point electrodes and said plurality of linear electrodes are made of thin conductive films.

7. The apparatus according to claim 1, further comprising an insulating substrate on which said plurality of point electrodes and said plurality of linear electrodes are formed.

8. A fingerprint detection apparatus for obtaining a two-dimensional image of a fingerprint, comprising:

a plurality of point electrodes arranged in rows and columns to form a matrix;

a plurality of parallel linear electrodes extending along a first direction corresponding to a direction of said rows or columns, wherein each linear electrode is positioned between pairs of first ones of said plurality of point electrodes forming one of said rows or columns and second ones of said plurality of point electrodes forming a next adjacent one of said rows or columns;

a plurality of connection lines extending in a direction different from said first direction, wherein each connection line commonly connects together a group of point electrodes including only one of said point electrodes of any one of the pairs so that the point electrodes of any pair on opposite sides of a given linear electrode are disconnected, with each said group being located at intervals of at least one point electrode in said first direction; and means for determining resistance between any particular linear electrode and a point electrode adjacent thereto by applying a predetermined voltage between the particular linear electrode and one of said plurality of connection lines.

9. The apparatus according to claim 8, wherein said means for determining resistance includes:

a plurality of first switches, wherein each first switch is connected to a respective one of said plurality of linear electrodes and a first terminal of a voltage source supplying said predetermined voltage, a plurality of second switches, wherein each second switch is connected to a respective one of said plurality of connection lines and a second terminal of said voltage source supplying said predetermined voltage, and means for performing sequence control relative to said plurality of first and second switches such that said predetermined voltage between said each linear electrode and each one of said plurality of connection lines is applied sequentially to determine the resistance between each linear electrode and each point electrode adjacent thereto.

10. The apparatus of according to claim 8, wherein said means for performing sequence control comprises a plurality of counters and decoders.

11. The apparatus according to claim 8, wherein said means for determining resistance includes a reference power source for applying said predetermined voltage.

12. The apparatus according to claim 11, wherein said means for determining resistance further includes a reference resistance having a predetermined value connected in series to said reference power source.

13. The apparatus according to claim 12, further comprising means for obtaining a fingerprint image based on plural resistance values being outputted from said means for determining resistance, said plural resistance values being determined in terms of a detected voltage drop and the relation thereof to a voltage drop across the reference resistance.

14. The apparatus according to claim 8, wherein said plurality of point electrodes and said plurality of linear electrodes are made of thin conductive films.

15. The apparatus according to claim 8, further comprising an insulating substrate on which said plurality of point electrodes and said plurality of linear electrodes are formed.

* * * * *